United States Patent [19]

Ogawa et al.

[11] Patent Number: 5,393,312
[45] Date of Patent: Feb. 28, 1995

[54] AGENT FOR PREVENTION OF SALT DAMAGE OF PLANTS AND A METHOD OF PREVENTING SALT DAMAGE OF PLANTS USING THE SAME

[75] Inventors: Kinya Ogawa, Kawasaki; Kenichi Ito, Joetsu; Yoichi Hirasawa, Higashikurume; Takao Oshima, Nakakubiki; Seiji Sakai, Tokyo, all of Japan

[73] Assignee: Shin-Etsu Chemical Co. Ltd., Tokyo, Japan

[21] Appl. No.: 101,312

[22] Filed: Aug. 3, 1993

[30] Foreign Application Priority Data

Aug. 7, 1992 [JP] Japan ................... 4-233023
Aug. 8, 1992 [JP] Japan ................... 4-232890

[51] Int. Cl.⁶ .................. A01B 79/00; A01C 1/00
[52] U.S. Cl. .................. 47/58; 47/DIG. 10; 71/903
[58] Field of Search .............. 47/58, DIG. 10; 71/903

[56] References Cited

U.S. PATENT DOCUMENTS 3,710,510  1/1973  Tully et al. ................ 47/58
4,004,368  1/1977  Tully ........................ 47/58

OTHER PUBLICATIONS

Hausenbuiller, 1978 Soil Science pp. 73–75; 481–484.
Black 1968 Soil–Plant Relationships pp. 92–94.

*Primary Examiner*—David T. Fox
*Assistant Examiner*—Erich E. Veitenheimer
*Attorney, Agent, or Firm*—Townsend & Banta

[57] ABSTRACT

An agent for the prevention of salt damage of plants for use in intermediate soil comprised of water-repellent particles, and a method of preventing salt damage to plants from salty soil using an agent to establish a water-repellent layer as a layer above the underground water level. An agent for the prevention of salt accumulation in greenhouse soil comprised of hydrophobic particles which are substantially hydrophobic. A salt accumulation prevention layer containing an agent for the prevention of salt accumulation in greenhouse soil which is provided at the surface layer or a prescribed depth from the surface layer of the greenhouse soil.

9 Claims, No Drawings

AGENT FOR PREVENTION OF SALT DAMAGE OF PLANTS AND A METHOD OF PREVENTING SALT DAMAGE OF PLANTS USING THE SAME

FIELD OF THE INVENTION

This invention relates to an agent for the prevention of salt and metal ion damage of plants for use in intermediate soil which comprises water-repellent particles. More specifically, it relates to an agent for prevention of salt damage of plants for use in a specific intermediate layer in soil in which plants are cultivated, and a method of preventing salt damage of plants using the same.

This invention can be very effectively used in plant production such as various types of agriculture and horticulture which suffers from salt damage.

Further, this invention can be applied to the prevention of salt and metal ion accumulation in soil, and more specifically to an agent for the prevention of salt accumulation in greenhouse soil used to prevent salt accumulation in a greenhouse soil, and a method of preventing salt accumulation in greenhouse soil by using the same.

BACKGROUND OF THE INVENTION

Salt damage of plants is a phenomenon in which the salts in soil for cultivating plants such as crops accumulate at the earth surface, rendering crop growth impossible. Currently, it is said that 10% of irrigated agricultural land in the world. i.e. approximately 210,000 km$^2$ of irrigated agricultural land, is affected by salt damage. For example, irrigated agriculture is generally conducted in the dry areas of various countries in the world, such as Pakistan, Southern parts of the United States, Egypt, Saudi Arabia and China.

When conducting irrigated agriculture in such dry areas, irrigated water penetrates into the earth and salts dissolve in the earth. The abundant sunlight, characteristic of dry areas, evaporates a lot of water from the earth surface, and underground water containing salts rises to the earth surface via the capillary phenomenon. The salts which have risen to the earth surface do not evaporate but accumulate at the earth surface, impede crop growth and eventually kill the crops. In particular, vegetables, melons, peppers and tomatoes suffer from serious salt damage.

Such salt damage has occurred since ancient times. For example, it is said that the cause of the fall of the ancient Mesopotamia civilization may have been salt damage. While the capillary phenomenon of salt-containing water can be regulated to a certain extent in areas where continuous irrigation is possible, salt damage is very serious in areas where only intermittent irrigation is possible. In areas where the temperature is very high and areas where rock salt lies underground, situations eventually reach the point at which agriculture must be abandoned.

There have been methods proposed to prevent this salt damage, such as a method which washes the soil with a large quantity of irrigation water, a method which replaces the soil with new soil, and a method which controls water evaporation by laying straw and such on the earth's surface. However, these methods not only require a lot of work and expense but also they are not methods which fundamentally prevent salt damage. Once salts accumulate at the earth surface, restoration of the land requires a lot of work, and thus crop production is doomed.

Recently, for the purpose of harvesting vegetables and fruits throughout the year, facility cultivation, particularly greenhouse cultivation using vinyl greenhouses, has become popular.

In facilities such as vinyl and glass greenhouses, the ceilings are covered with vinyl or glass to keep the room temperature and the soil temperature at appropriate levels even in winter, and the temperature is maintained by burning kerosene and such in winter. Also, since natural rainfall is blocked, periodic sprinkling of water is conducted to allow the harvesting of vegetables and fruits throughout the year.

As the greenhouse culture has spread throughout Japan as described above, there has arisen the problem of the accumulation of high concentration salts in the soil in greenhouses (greenhouse soil) which have affected the harvests.

That is, artificial water sprinkling is conducted in greenhouses because the ceilings prevent natural rains from wetting the soil. However, the amount of the water sprinkling is limited to the minimum required level for the crops, and thus the artificial water sprinkling is always kept rather low. Because of this, the wash-purge action of soil by rainfalls, such as for the outdoor soil, is insufficient, and salts in lower soil layers tend to be carried with water ascending through the soil because of the capillary phenomenon, resulting in accumulation at the soil surface. When intermittent sprinkling is conducted rather than drip sprinkling, water moves up and down in the soil to aggravate salt and metal ion accumulation.

Furthermore, to harvest more crops, greenhouse soil is always supplied with a rather large quantity of chemical fertilizers. Decomposed chemical fertilizers release sodium ions, calcium ions, nitrate ions, etc. and these ions, which would be naturally washed-purged out into lower layers in outdoor natural soil, however in greenhouse soil, accumulate at the soil surface because of the capillary phenomenon, resulting in extremely salty soil.

When such salty soil occurs, it not only causes excess-salt disorders, but causes abnormalities in the soil environment surrounding the roots, such as the degradation of the microorganism fauna, and plant diseases due to abnormally high absorption of metal ion, which is one of the causes of crop production instability.

Conventionally, improvement measures against such salt accumulation, water-pouring treatments, cultivation of cleaning crops, application of coarse organic materials, desalting by removal of the covering, soil removal, soil import, etc. have been carried out. However, since these methods require a lot of work and expense, new methods have been sought.

SUMMARY OF THE INVENTION

The inventors have been earnestly studying the problems described above from the standpoint of the fundamental prevention of crop damage due to salt and metal ion damage, and were surprised to discover that when a layer of water-repellent particles is provided in or below the soil in which plants are cultivated, this layer acts as a salt damage prevention agent and that long term plant cultivation free of salt damage becomes possible.

It is an object of this invention to fundamentally, efficiently and steadily prevent salt damage to plants for a long period of time by using a new agent for salt damage-prevention for intermediate soil and also by using different methods than those conventionally employed.

It is another object of this invention to provide an agent for the prevention of salt-accumulation in greenhouse soil which can prevent salt accumulation in greenhouse soil without requiring a lot of work and expense, and a method of preventing salt accumulation in greenhouse soil using these agents.

This invention provides an agent for the prevention of salt damage of plants for use in intermediate soil comprising water-repellent particles.

The agent for prevention of salt damage of plants may consist of water-repellent sand. The water-repellent particles or the water-repellent sand may be treated to be water-repellent with a silicone compound, a fluoro compound, or a mixed compound of these. The average size of the water-repellent particles or water-repellent sand may be about 0.1–2 mm.

Next, this invention provides a method of preventing salt damage to plants which comprises: preventing salt damage to plants by salty soil through the use of a water-repellent layer comprising an agent for the prevention of salt damage of plants in an intermediate soil layer above the underground water level, this layer being a layer to which plant roots reach or lower than that.

Further, this invention provides a method of producing plants which comprises: cultivating plants in soil with a water-repellent layer comprising an agent for the prevention of salt damage of plants for use in an intermediate soil layer above the underground water level, this layer being a layer to which plant roots reach or lower than that.

The soil is mixed with or treated with one or more items selected from among peat moss, a water absorbent polymer and a water-retentive polymer over the water-repellent layer comprising an agent for the prevention of salt damage of plants for use in intermediate soil. The water-repellent layer comprising the agent for the prevention of salt damage is about a 0.5–500 mm thick layer, and more preferably about a 10–200 mm thick layer.

Next, this invention provides an agent for the prevention of salt accumulation in greenhouse soil comprising hydrophobic particles which are substantially hydrophobic. The agent is to be used in greenhouse soil, and intended to solve the problems specific to greenhouse soil as described above, and is for new use in the prevention of salt accumulation in greenhouse soil.

A major characteristic of this invention is its capability to remarkably reduce water evaporation from the surface. In particular, the effect is even more remarkable when two vertically separated water-repellent layers are provided.

The hydrophobic particles may be sand and/or dirt particles treated with a water-repellent agent.

The water-repellent agent may be a silicone water-repellent agent, a fluoro water-repellent agent, a fluoro silicone water-repellent agent or a mixed agent of these.

Further, this invention provides a method of preventing salt accumulation in greenhouse soil which comprises providing a salt accumulation prevention layer containing an agent for the prevention of salt accumulation in greenhouse soil at a prescribed depth from the surface layer of the greenhouse soil.

The thickness of the salt accumulation prevention layer is preferably in the range of about 0.5–500 mm, and more preferably in the range of about 10–200 mm.

DETAILED DESCRIPTION OF THE INVENTION

This invention will be described in detail below. For the water-repellent particles used in this invention, anything which has water-repellent characteristics and is in particle form may be used, and the material may be either inorganic or organic.

The agent for prevention of salt damage of this invention consists primarily of water-repellent particles. Obviously, it is possible to mix in, for example, dirt or fertilizers within the range where the effects of this invention are not destroyed.

In this invention, the word "plants" primarily means "crops". However, in the implementation of this invention, this is not limited to just crops but also includes all life which lives by drawing nutrients from the soil, typically represented by trees and grass.

The agent for the prevention of salt damage to plants for use in intermediate soil of this invention is a salt damage prevention agent not used on the earth's surface but within the layers constituting the soil, and therefore it is used in a fundamentally different location than conventional soil improvement agents which are primarily used on the soil's surface.

Water-repellent treatment of the soil surface was found to seriously impede plant growth. However, this is not the case with this invention. Rain and artificially supplied water can be absorbed by the soil very well, providing preferable soil for the growth of plants.

Conventional soil improvement agents, which have been applied on the earth's surface, had the shortcomings such as degradation of their original characteristics by sunlight and scattering due to winds, etc. However, the agent for the prevention of salt damage of this invention does not have such conventional shortcomings and shows excellent performance.

Also, it is an object to not be limited to simply improving soil in general. This is a new useful agent for the prevention of salt and metal ion damage of plants the most significant characteristic of which is that it is specifically used for the prevention of salt damage to plants.

For the water-repellent particles in this invention, sand and/or dirt particles with their particle surfaces treated with a water-repellent agent is preferable, and they can be used individually or mixed together. More preferable is water-repellent sand which is sand treated with a water-repellent agent.

It is obviously possible to use sand simply soaked in heavy oil for the water-repellent treatment. This method is easy and particularly preferable in irrigated farmland in petroleum producing areas such as Saudi Arabia.

Large amounts of sand can be collected easily from sand beaches on sea shores, sand dunes and deserts in the dry areas where irrigation agriculture is conducted. Dirt which has been baked into a particle form can be used. For example, by using a large amount of sludge baked into a particle form, an effective use of the sludge as well as sludge disposal are accomplished simultaneously. "Sand" includes "fine gravel" and "dirt" includes "clay".

For the water-repellent agent used, there is no specific limitation as long as it is generally used as a water-repellent agent. More preferable is a silicone compound water-repellent agent such as the silicone type and fluoro silicone type because of its water-repellent performance and lower cost.

For the silicone water-repellent agent, a silicone compound represented by the following general formula (1) is an example. It can be used directly (without solvents) or it can be used after dilution in solvents such as toluene, xylene or trichloroethylene, or it can be used in an emulsion form. Also, hardening catalysts such as dibutyl tin dilaurate, dibutyl tin diacetate, dioctyl tin laurate or iron octate can be used.

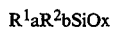  (1)

$R^1$ stands for homo or hetero, unsubstituted or substituted monovalent hydrocarbon groups. $R^2$ stands for homo or hetero groups selected from hydrolyzable groups, —OH and —H. A and b are numbers defined as $0 \leq a < 4, 0 \leq b \leq 4$ and $0 < a+b \leq 4$, and $x = (4-a-b)/2$.

For example, in the general formula (1), $R^1$ is a group made by replacing all or part of the hydrogen atoms bonded to carbon atoms with halogen atoms or cyano groups and such in groups including alkyl groups with a carbon number of 1–15, such as methyl, ethyl, propyl and decyl groups, alkenyl groups such as vinyl and allyl groups, aryl groups such as phenyl groups, cyclo alkyl groups.

$R^2$ can be hydrolyzable groups such as alkoxy groups, acyloxy groups, ketoxime groups, amino groups, aminoxy groups, amide groups, enoxy groups and alkenyloxy groups, halogen groups such as chlorine, —$OR^3$ ($R^3$ is Na or K), —OH or —H.

For examples of actual silicone compounds, the following compounds represented by (2) through (5), or their partially hydrolyzed products or their co-hydrolyzed products, can be used.

HO—Si(ONa)(CH$_3$)—[OSi(ONa)CH$_3$]$_n$—OH (n: 0, 1, 2)   (2)

CH$_3$—[SiO(CH$_3$)$_2$]$_m$—[SiO(H)(CH$_3$)]$_l$—Si(CH$_3$)$_3$   (3)
(l, m: 0 or integer)

$R^4$—[SiO(CH$_3$)$_2$]$_k$—Si(CH$_3$)$_2$R$^4$   (4)
(k: integer, $R^4$: —OH, —CH=CH$_2$, OCH$_3$)

CH$_3$SiCl$_3$, C$_{10}$H$_{21}$SiCl$_3$, CF$_3$CH$_2$CH$_2$SiCl$_3$,   (5)
CH$_3$Si(OCH$_3$)$_3$,
CF$_3$CH$_2$CH$_2$Si(OCH$_3$)$_3$

A silazane compound represented by formula (6)

(CH$_3$)$_3$SiNH—Si(CH$_3$)$_3$   (6)

is also useful as a water-repellent agent for use in this invention.

For the fluoro water-repellent agent, fluoro compounds represented by the following general formula (7), (10) to (19) and (22) are examples. It can be used after dilution in solvents, or it can be used in an emulsion form, if necessary. In the formulas, l, m and n represent integers.

   (7)

X stands for H or CH$_3$. Y stands for either (8) or (9).

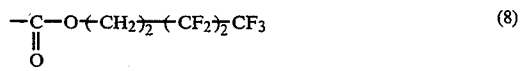   (8)

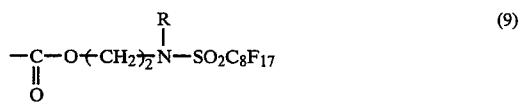   (9)

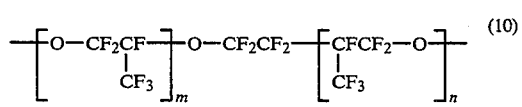   (10)

   (11)

   (12)

   (13)

   (14)

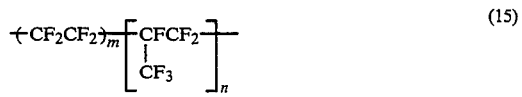   (15)

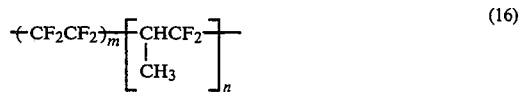   (16)

   (17)

   (18)

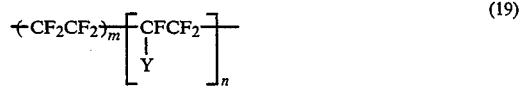   (19)

Y stands for —OCF$_3$ or either (20) or (21).

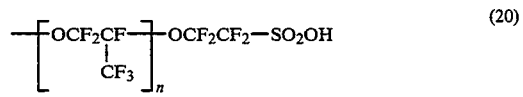   (20)

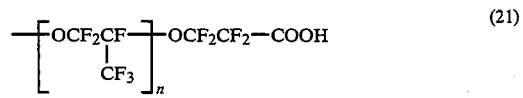   (21)

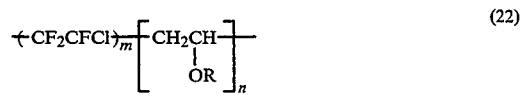   (22)

R stands for a cyclohexyl group or a butyl group.

As a fluoro type water-repellent agent, one denaturated by organosilane or organopolysiloxane may be useful, and particularly, one denaturated by organosilane or organopolysiloxane including a hydrolyzable group. OH group or H may be useful for obtaining long life water-repellency.

An example of such silane compounds is a fluorosilicone shown below as formula (23).

$$C_nF_{2n+1}CH_2CH_2Si(OMe)_{3-p} \overset{(CH_3)_p}{|} \quad (23)$$

[n is an integer of 6 to 8; p is any of 0, 1, or 2; and Me stands for $CH_3$.]

An example of a compound represented by the formula (23) is a silane compound shown below as formula (24) or (25).

$$C_8F_{17}CH_2CH_2Si(OMe)_2 \overset{Me}{|} \quad (24)$$

$$C_8F_{17}CH_2CH_2Si(OMe)_3 \quad (25)$$

Another example of a fluoro water-repellent agent is a co-polymer with other silanes such as $RSi(OMe)_3$, $R_2Si(OMe)_2$ or $H.RSi(OMe)_2$ (R is an alkyl group having 1 to 12 carbons.) as well as a perfluoroacrylate. Expecially, a co-polymer with an alkylsilane having a long chain is preferable. Further example is a co-polymer of:

$$CH_2=CCO_2(CH_2)_3Si(OCH_3)_3 \overset{CH_3}{|} \quad (26)$$

and $$CH_2=CCO_2(CH_2)_2C_nF_{2n+1} \overset{CH_3}{|} \quad (27)$$

where n is an integer.

For the method of surface treatment of sand or dirt particles with a water-repellent agent, it is sufficient to follow methods usually employed in the surface treatment of fine particles. For example, it is possible to mix various silicone oils with sand using mechanochemical methods, thus performing surface treatment to produce hydrophobic particles.

For the hydrophobic particles, in addition to water-repellent sand as described above, fine particles of high molecular weight polymers (plastics) whose surfaces are hydrophobic can be used. In particular, organosilicone types are preferable, and polymethylsilsesquioxane is even more preferable.

Also, for example, it is possible to use waste plastic crushed into a particle form, thus effectively using waste plastic to solve the waste plastic disposal problem. It is also possible to give a water-repellent treatment to these high molecular weight polymers before use.

In addition to the hydrophobic particles described above as examples, needless to say, hydrophobic particles including hydrophobic particulate metal oxides such as silica, alumina, titania, zirconia, vanadium oxide and iron oxide, crushed products of glass beads and oil shale, and oil sand can be used. These are more preferable when their surfaces have been treated with a silicone water-repellent agent. However, oil shell and oil sand can be used effectively without silicone treatment.

The average particle size of the water-repellent particles or water-repellent sand is preferably about 0.1–5 mm. The smaller the particle size of the soil on which they are to used, the smaller their average particle size should be.

If water conservation in the soil layer in which this invention is desired, it is preferable to use an agent for the prevention of salt damage of plants for use in an intermediate soil comprising water-repellent particles with a smaller average particle size. Also, it is obviously possible to use a mixture of particles with different average particle sizes. For example, in order to reduce soil contamination, it is particularly preferable to use coarse water-repellent sand and fine water-repellent sand mixed together appropriately.

This invention is an epoch making method which uses the agent for the prevention of salt damage described above for use in an intermediate layer between the underground water level and the top layer, which plant roots reach in the soil for plant cultivation, and thus newly and artificially establishes a water-repellent layer in the soil to prevent salt damage to plants.

It is not effective to establish the water-repellent layer at a lower level where free water accumulates. Also, it is not effective to establish the layer at the earth surface or close to the earth surface, because that would impede the growth of plant roots.

Also, the agent for the prevention of salt damage of this invention is easy to handle, so that it can be carried in bags, just like fertilizers, and easily laid on the approriated layer in a dug area of soil for plant cultivation to establish the water-repellent layer. Also, it has the conventionally unheard-of advantage that, since the salt damage prevention agent for intermediate soil is used in the soil, it will not be blown away and lost by the strong winds characteristic of dry areas.

In this invention, it is required that at least one water-repellent layer comprised of an agent for prevention of salt damage of this invention is included in the soil for plants, and two or more water-repellent layers may be established as necessary.

There is no particular limitations on the thickness of the water-repellent layer, and the thickness can be decided by considering the weather phenomena in the area where this invention is to be applied and the soil characteristics such as the salt concentration in the soil.

For example, if the extent of the salt damage is relatively mild, or if the soil on which this invention is to be applied has relatively coarse soil particles, or if the nodular structure is well developed, then a thickness of about 0.5–50 mm is sufficient.

However, if the soil particles are fine enough to infiltrate the water-repellent layer and are likely to impede the water-repellency of the water-repellent layer as a whole, or if water conservation in the soil should be actively pursued, then a thicker water-repellent layer is preferable. For example, it is possible to establish a 5–500 mm thick water-repellent layer. The thickness of the layer should be determined according to the amount of the agent for prevention of salt damage to be used and the extent of the salt damage, but, in general, a thickness of about 10–200 mm is the preferable range.

Furthermore, the method of this invention can be applied in combination with a water-retentive layer which is water-retentive. This water-retentive layer can be obtained by adding any water-retentive agent to the soil. Examples of the water-retentive agents are water absorbent polymers, peat moss, inorganic perlite and vermiculite.

By using the method of this invention jointly with a water-retentive layer, not only salt damage prevention but cultivation of plants such as crops with good production efficiency becomes possible. In particular, it is preferable to jointly use soil with high water-retentivity for crops with high water absorption, and an excellent effect can be expected with the cultivation of such crops.

Particularly preferable is a method of producing crops and such, in soil which has a water-retentive layer mixed with or treated with one or more items selected from among peat moss, a water absorbent polymer and a water-retentive polymer over the water-repellent layer comprising the salt damage prevention agent for intermediate soil.

In this particularly preferable method, it is sufficient to mix peat moss, a water absorbent polymer or a water-retentive polymer in the soil layer which is above the water-repellent layer and is where the roots of the plants absorb water, or to treat the soil particles so that their surfaces are coated with peat moss, a water absorbent polymer or a water-retentive polymer. Particularly preferable is soil composed of sand or dirt treated with water soluble cellulose derivatives, or of dirt made nodular with PVA.

Particularly in melon cultivation, there is a problem with the loss of sweetness when the around water level rises as a result of too much rain. This invention can be used to easily adjust the absorption of water to crops such as melon, which are sensitive to the water level in developing good taste. Therefore this invention is preferably applied to water sensitive cultivation in order to provide desirable amounts of water to the crops.

In order to introduce the water-repellent layer of water-repellent particles to the target thickness in the soil which needs the salt damage prevention, it is sufficient, for example, to lay the agent for the prevention of salt damage in the soil at the farmland site.

The method of this invention can be implemented by transporting bags of the agent for the prevention of salt damage prepared in a plant to the site, or; mixing sand and silicone oil by using a mixer-agitator similar to a concrete mixer on the irrigated farmland site to prepare the agent for the prevention of salt damage, or; going to the irrigated farmland from the silicone oil plant with a mixer vehicle, while preparing the agent for the prevention of salt damage by giving water-repellent treatment to the sand along the way, and then artificially establishing in the soil a layer of the agent for the prevention of salt damage.

By using the agent for the prevention of salt damage, it is possible to cultivate plants such as crops in irrigated agricultural areas with serious salt damage and produce crops efficiently.

The agent for the prevention of salt accumulation in greenhouse soil of this invention has hydrophobic particles which are substantially hydrophobic as the main component. By forming a layer containing this hydrophobic agent in the soil, the rise of salt-containing water is stopped at this layer and the accumulation of salts at the soil surface can be prevented.

The hydrophobic particles can be anything hydrophobic which is in particle form, and the material may be either inorganic or organic. Also, the concept "hydrophobicity" includes so-called "water repellency".

It is sufficient if the agent for the prevention of salt accumulation in greenhouse soil of this invention is primarily composed of said hydrophobic particles, and it is within the scope of this invention even if particles with other characteristics are mixed in, as long as the hydrophobicity, the effect of the agent, as a whole is not lost.

For the hydrophobic particles, sand and/or dirt particles with their particle surfaces treated with a water-repellent agent are practical, and they can be used individually or mixed together. More preferable is water-repellent sand which is sand treated with a water-repellent agent.

For the water-repellent agent used, these described before can be used.

When preventing the accumulation of salts in greenhouse soil by using an agent for the prevention of salt accumulation in greenhouse soil described above, a salt accumulation prevention layer containing the agent for the prevention of salt accumulation in greenhouse soil is provided at the surface layer or at a prescribed depth from the surface layer of the greenhouse soil. Since this salt accumulation prevention layer is hydrophobic, the rise of salt-containing water is stopped at the layer and the accumulation of salts at the soil surface can be prevented.

It is sufficient if this salt accumulation prevention layer is primarily comprised of the agent for the prevention of salt accumulation in greenhouse soil of this invention. It is within the scope of this invention if particles with other characteristics are mixed in to comprise the layer, as long as the hydrophobicity, which is the effect of this agent, is not lost for the layer as a whole.

The thickness of this salt accumulation prevention layer can be changed according to the degree of salt accumulation, with a preferable range of about 0.5–500 mm, and a more preferable range of about 10–200 mm.

For the cultivation of crops requiring a large quantity of water, it is also a good idea to provide a water-retentive layer over the salt accumulation prevention layer. This water-retentive layer may consist of a water-containing sand layer, but it may also be obtained by mixing any water-retentive agent into the soil. Examples for the water-retentive agent would be peat moss, and sand and/or dirt treated with a water absorbent polymer or a water-retentive polymer.

A water pipe in the ground can be used to preferably provide enough water for the crops in this invention.

The agent for the prevention of salt damage of plants for use in intermediate soil of this invention, when used in an earth layer in the soil of areas which suffer from salt damage, can fundamentally and efficiently prevent salt damage to plants.

Also, by using the agent for the prevention of salt damage of this invention in a layer above the underground water level, this layer being a layer to which plant roots reach or in a layer lower than that, it is possible to prevent salt damage to plants caused by the soil, and to efficiently produce crops and such in irrigated farmlands which suffer from salt damage.

Furthermore, soil in which a water-retentive layer which is water-retentive is established above the soil layer consisting of the agent for prevention of salt damage of this invention can be expected to produce excellent growth effects with respect to the cultivation of crops with high water absorption.

Additionally, this invention allows easy prevention of salt accumulation in greenhouse soil, and contributes to the augmentation of crop harvests using greenhouses.

Next, this invention will be described by referring to examples.

EXAMPLE 1

100 g of hexane containing 3% monodecyl trichlorosilane was added to 1000 g of quartz sand No. 7, and 8 hours of mixing-agitation was conducted using a 2-liter blender with a vacuum jacket. After that, hexane was recovered under vacuum, and after the hexane was recovered, heat-drying was conducted at 100° C. for 2 hours. Thus, an agent for the prevention of salt damage of plants for use in intermediate soil of this invention was prepared.

The following test was conducted by using the agent for the prevention of salt damage prepared as described above. One liter of salt water with 3 g of common salt was put into a 10-liter beaker, and Asano No. 4 quartz sand was added to this beaker so that the sand was barely soaked by the salt water. The agent for the prevention of salt damage was laid to have a thickness of 30 mm, and again on top of that Asano No. 7 quartz sand was laid to have a thickness of 10 mm, and thus a laboratory scale artificial soil was formed. This was left standing for 200 hours at 40° C.

Comparative Example 1

Artificial soil was prepared by using Asano No. 7 quartz sand in place of the 30-mm water-repellent layer of the agent for the prevention of salt damage in the artificial soil of Example 1, and was left standing for 200 hours at 40° C., in the same manner as for Example 1.

As a result, no common salt precipitation was observed on the top part of the layer of the agent for the prevention of salt damage in the artificial soil of Example 1. However, in Comparative Example 1, 65% of the common salt from the lowest layer of Asano No. 4 quartz sand containing common salt precipitated on the surface of the artificial soil.

EXAMPLE 2

200 g of Asano No. 4 quartz sand and 20 g of heavy oil were mixed and agitated in a 2-liter agitator for 8 hours at 40° C. to prepare an agent for prevention of salt damage of plants for use in the intermediate soil of this invention.

The following test was conducted by using the agent for the prevention of salt damage prepared as described above. 2 g of common salt and 150 g of Asano No. 4 quartz sand were put into a 200-ml beaker and thoroughly mixed. Then, on top of that, the agent for the prevention of salt damage described above was laid on. This was heated to 40° C. and left standing for 400 hours, during which 5 g of water was sprayed on every 10 hours.

Comparative Example 2

Artificial sand was prepared by using common sand instead of the water-repellent layer of the agent for the prevention of salt damage in the artificial soil of Example 2, and left standing under the same conditions as for Example 2.

As a result, no common salt precipitation was observed on the top part of the layer of the agent for the prevention of salt damage in the artificial soil of Example 2. However, in Comparative Example 2, 80% of the common salt from the lowest layer of Asano No. 4 quartz sand containing common salt precipitated on the surface of the artificial soil surface.

EXAMPLE 3

100 g of hexane containing 3% perfluorooctane modified silicone was added to 1000 g of quartz sand No. 7, and 8 hours of mixing-agitation was conducted using a 2-liter blender with a vacuum jacket. After that, hexane was recovered under a vacuum, and after the hexane was recovered, heat-drying was conducted at 100° C. for 2 hours. Thus, an agent for the prevention of salt damage of plants for use in intermediate soil of this invention was prepared.

The following test was conducted by using the agent for prevention of salt damage prepared as described above. Asano No. 4 quartz sand containing 2 wt % of common salt was laid to the bottom of a polyethylene foam container to have a thickness of 5 cm. On top of that, the agent for prevention of salt damage was laid to have a thickness of 5 cm, and again on top of that, soil containing humus was laid on to have a thickness of 5 cm to cover it. Thus, a laboratory scale artificial soil for plant cultivation was formed.

Lettuce seeds were planted in this soil and the container was placed in a glass greenhouse with the temperature kept at 20°–35° C. Once daily, 0.5 g/cm² of water was sprinkled to cultivate the lettuce.

Comparative Example 3

Artificial soil was prepared by using Asano No. 7 quartz sand in place of the 30-mm water-repellent layer of the agent for prevention of salt damage in the artificial soil of Example 3, and lettuce cultivation was conducted in the same manner as Example 3.

As a result, 45 days later, the lettuce plants of Example 3 had grown normally to produce lettuce. For Comparative Example 3, however, salt precipitation was observed after the 20th day, and growth of the lettuce plants was clearly impeded.

EXAMPLE 4

Asano No. 4 quartz sand containing 2 wt % of common salt was laid on the bottom of a polyethylene foam container to have a thickness of 5 cm. On top of that, the agent for the prevention of salt damage prepared in Example 3 was laid to have a thickness of 5 cm, and again on top of that, soil containing humus, after being treated with a 3% solution of 65SH-400 to have a 1% solid content, was laid to have a thickness of 5 cm to cover it. Thus, a laboratory scale artificial soil for plant cultivation was formed.

Lettuce seeds were planted in this soil and the container was placed in a glass greenhouse with the temperature kept at 20°–35° C. Once daily, 0.5 g/cm² of water was sprinkled to cultivate the lettuce. As a result, the lettuce plants grew even better than those of Example 3.

The examples described above confirm that the agent for the prevention of salt damage of plants for use in intermediate soil of this invention demonstrates remarkable effects with regard to preventing salt damage prevention of soil, and the examples also show that the agent can be utilized in irrigated agricultural areas which suffer from salt damage.

EXAMPLE 5

The agent for the prevention of salt accumulation in greenhouse soil comprised of water-repellent sand can be obtained, for example, with the following procedure. First, 100 g of hexane containing 3% monodecyl trichlorosilane is added to 1000 g of quartz sand No. 7, and 8 hours of mixing-agitation is conducted using a 2-liter capacity blender with a vacuum jacket. After that, hexane was recovered under vacuum, and heating was conducted at 100° C. for 2 hours. Thus, an agent for the prevention of salt accumulation in greenhouse soil composed of water-repellent sand was obtained. Using this, the following experiment was conducted.

A 10 cm layer of Asano quartz sand No. 7 was laid on the bottom of a planter. On top of that, the water-repellent sand described above was added to have a thickness of 3 cm. On top of that, farmland soil was added to have a thickness of 20 cm. Again on top of that, the water-repellent sand was added to have a thickness of 3 cm. The planter was let stand outside, and 20 ml/m$^2$ of a 5% advanced compound fertilizer (15-15-15) solution was sprinkled on once a day. After 60 days, the water content of the farmland soil was observed to be 44%, which is a sufficient water content for crop growth. No accumulation of salts at the surface was observed.

Comparative Example 4

The testing was conducted in the same manner as for Example 5, except that the sand No. 7, instead of the water-repellent sand of Example 5, was added to have the same thickness. After 60 days, the water content of the farmland soil was 25%, and the vicinity of the surface was particularly dry. Also, the precipitation of salts was observed at the surface.

EXAMPLE 6

100 g of hexane containing 3% monodecyl trichlorosilane was added to 1000 g of quartz sand No. 7, and 8 hours of mixing-agitation was conducted using a 2-liter blender with a vacuum jacket. After that, hexane was recovered under vacuum, and after the hexane was recovered, heat-drying was conducted at 100° C. for 2 hours. Thus, an agent for the prevention of salt accumulation in greenhouse soil of this invention was prepared.

The following test was conducted by using the agent for prevention of salt accumulation in greenhouse soil prepared as described above. One liter of salt water with 3 g of common salt was put into a 10 liter beaker, and Asano No. 4 quartz sand was added to this beaker so that the sand was barely soaked by the salt water. On top of that, the agent for the prevention of salt accumulation in greenhouse soil was laid to have a thickness of 30 mm, and again on top of that Asano No. 7 quartz sand was laid to have a thickness of 10 mm, and thus a laboratory scale artificial soil was formed. This was left standing for 200 hours at 40° C.

Comparative Example 5

Artificial soil was prepared by using Asano No. 7 quartz sand in place of the 30 mm water-repellent layer of the agent for the prevention of salt accumulation in greenhouse soil in the artificial soil of Example 6, and was left standing for 200 hours at 40° C., in the same manner as Example 6.

As a result, no common salt precipitation was observed in the upper part of the layer of the agent for the prevention of salt accumulation in greenhouse soil in the artificial soil of Example 6. However, in Comparative Example 5, 65% of the common salt from the lowest layer of Asano No. 4 quartz sand containing common salt precipitated on the surface of the artificial soil surface.

EXAMPLE 7

100 g of hexane containing 3% monodecyl trichlorosilane was added to 1000 g of quartz sand No. 7, and 8 hours of mixing-agitation was conducted using a 2-liter blender with a vacuum jacket. After that, hexane was recovered under vacuum, and after the hexane was recovered, heat-drying was conducted at 100° C. for 2 hours. Thus, an agent for prevention of metal ion damage of plants for use in intermediate soil of this invention was prepared.

The following test was conducted by using the agent for prevention agent of metal ion damage prepared as described above. One liter of water containing 1000 ppm of manganese chloride and 2000 ppm of potassium chromate was put into a 10-liter beaker, and Asano No. 4 quartz sand was added to this beaker so that the sand was barely soaked by the metal ion water. The agent for the prevention of metal ion damage was laid on to have a thickness of 30 mm, and again on top of that Asano No. 7 quartz sand was laid to have a thickness of 10 mm, and thus a laboratory scale artificial soil was formed. This was left standing for 200 hours at 40° C. As a result, no chromic acid and manganese ion precipitation was observed on the top part of the layer of the agent for the prevention of metal ion damage in the artificial soil of Example 7.

What is claimed:

1. A method of preventing salt and metal damage to plants which comprises forming a discrete water-repellent layer above an underground water level and wherein said water-repellant layer is lower than the level of plant roots, said water-repellant layer consisting essentially of hydrophobic particles and being 0.5–500 mm thick.

2. A method of producing plants which comprises cultivating plants in soil having a discrete water-repellant layer above an underground water level and wherein said water-repellant layer is lower than the level of plant roots, said water-repellant layer consisting essentially of hydrophobic particles and being 0.5–500 mm thick.

3. A method of preventing salt and metal ion damage to plants, according to claim 1:
   wherein a soil mixed with or treated with one or more items selected from among peat moss, a water absorbent polymer and a water-retentive polymer is provided over said water-repellent layer.

4. A method of preventing salt and metal ion damage to plants, according to claim 1:
   wherein water is provided by a water pipe located below the ground.

5. A method of preventing salt and metal ion damage to plants, according to claim 1:
   wherein said water-repellent layer is about a 10–200 mm thick layer.

6. A method of preventing salt and metal ion accumulation in greenhouse soil which comprises providing a discrete salt and metal ion accumulation protection layer consisting essentially of hydrophobic particles which are below a surface layer of soil, said protection layer being 0.5–500 mm thick.

7. A method of preventing salt and metal ion accumulation in greenhouse soil, according to claim 6,
   wherein a thickness of said salt accumulation prevention layer is in the range of about 10–200 mm.

8. A method of preventing salt and metal ion accumulation in greenhouse soil which comprises providing a discrete salt and metal ion accumulation protection layer consisting essentially of hydrophobic particles which are a surface layer of soil, said particle layer being 0.5–500 mm thick.

9. A method of preventing salt and metal ion accumulation in greenhouse soil, according to claim 8,
   wherein a thickness of said salt accumulation prevention layer is in the range of about 10–200 mm.

* * * * *